Figure 1:
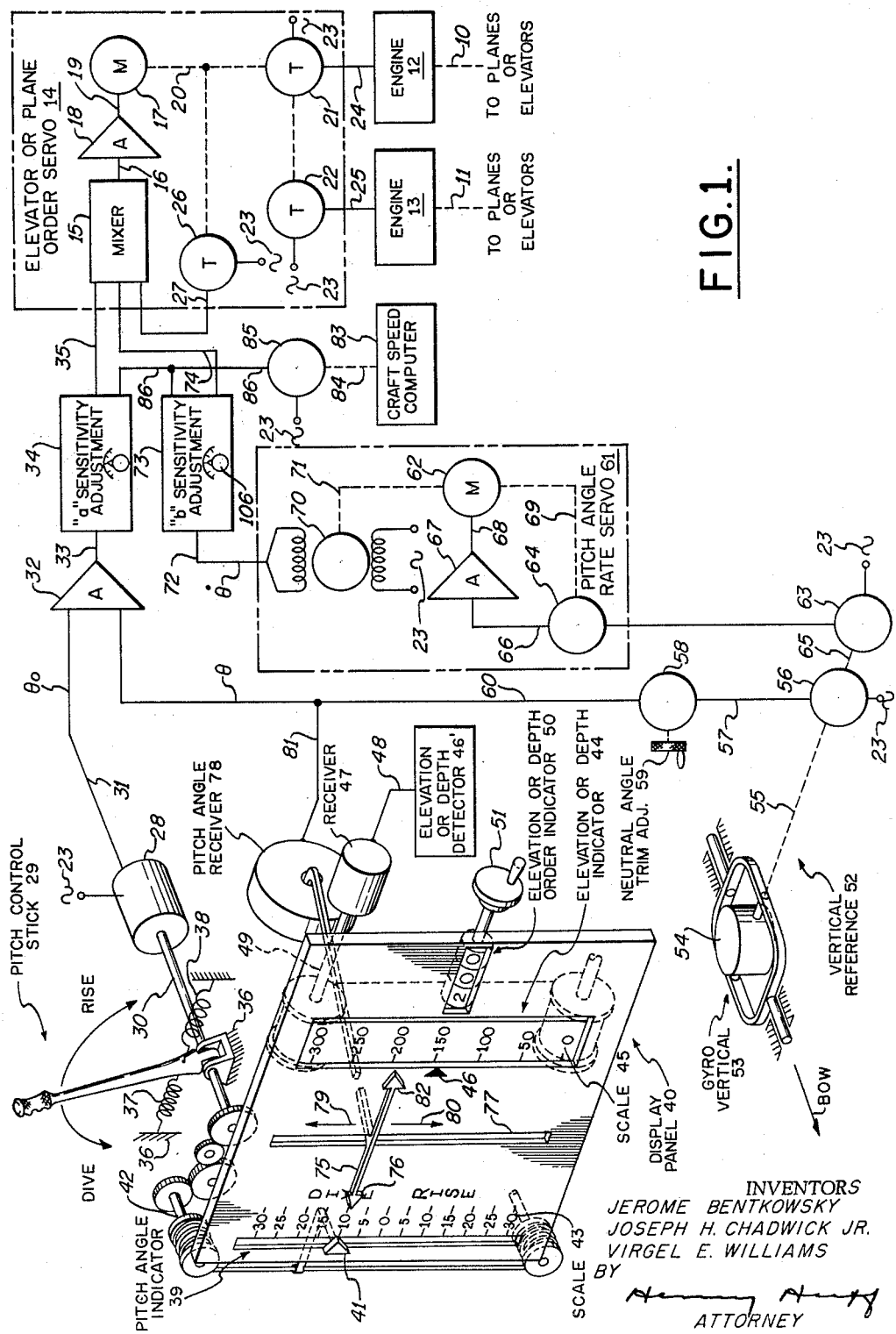

United States Patent Office 3,106,903
Patented Oct. 15, 1963

3,106,903
AUTOMATIC PITCH CONTROL SYSTEM
Jerome Bentkowsky, Charlottesville, Va., Joseph H. Chadwick, Jr., Amityville, N.Y., and Virgel E. Williams, Charlottesville, Va., assignors to Sperry Rand Corporation, Great Neck, N.Y., a corporation of Delaware
Filed Apr. 17, 1962, Ser. No. 188,118
15 Claims. (Cl. 114—16)

This invention relates to an elevational control system for navigable craft. More particularly, the invention concerns an improved pitch angle control system that operates depending on a manual pitch angle order to change the elevational level of the craft to an ordered depth for a submarine or an ordered altitude or elevation for aircraft.

In the improved system, the change order input to the servo means connected to operate the diving planes or elevators of the craft determines the craft's pitch angle rather than the angle of movement of the planes or elevators from a null or streamline condition. At present, manually operable systems for changing the depth of a submarine, in particular, require that the planes follow the movements of a member controlled by the planesman. Thusly, pushing the member forward, as in the stick control of an aircraft, sets the planes to cause the submarine to dive, and pulling the member back sets the planes to cause the submarine to rise. Under ideal conditions with such a system, the planesman is required to perform six movements of the member to change the submarine to its ordered depth. In descending to a lower submarine depth, the first forward movement of the member operates the planes to nose the bow of the submarine downwardly. Reverse planes are then applied by the second movement of the member to stop the motion of the submarine about its pitch axis at a dive angle that depends on other conditions such as the depth order, speed and performance time. In the third operation by the planesman, the planes are returned to a streamline condition with the submarine pitched to descend in an attitude controlled by the planesman. Three additional operations of reverse character are required of the planesman to bring the submarine to its ordered depth in an attitude in which the dive angle has been removed. This is accomplished by fourthly moving the member back to stop the descent of the submarine by raising its bow upwardly, fifthly counteracting the required condition of the planes to effect the fourth operation, and sixthly by moving the planes to streamline with the submarine level at the ordered depth. More than the noted movements of the member by the planesman are generally required before orders are completely executed because of the unrelated variables noted. Two movements of the member by the planesman is all that is required in the improved system to execute elevation or depth change orders quickly, accurately and smoothly.

The primary object of the present invention is to provide a system for controlling the elevation or depth of a navigable craft that only requires two movements of a manually operable member or stick to execute change in elevation or depth orders.

In the improved system, the pitch angle orders are derived from an order synchro that is controlled by a manually movable member in the form of a control stick. The movement of the stick from a null position is observed by a planesman on a pitch angle indicator included on a display panel. The stick under control of the planesman is operatively connected to the movable part of the pitch angle indicator to designate the ordered pitch angle. The stick of the pitch angle order input means is also operatively connected to the order synchro to provide an output depending on its movement from a null position.

The means provided in the improved system for changing the pitch angle of the craft or submarine includes an elevation or depth indicator with relatively movable scale and pointer parts located on the display panel in front of the planesman. The display panel provided includes a movable element with a part readable on the scale of the elevation indicator and a part readable with relation to the pitch angle indicator. The pitch angle control means of the system further includes a vertical reference that provides an output in accordance with the pitch tilt angle of the craft that is operatively connected to the movable two part element common to the elevation and pitch angle indicators on the display panel. As the craft moves about its pitch axis, the part of the movable element readable on the pitch angle indicator indicating actual craft pitch is compared by the planesman to the ordered pitch angle. The change in elevation or depth of the craft is also observed by the relative movement of the scale and pointer parts of the elevation or depth indicator.

At the pull-out elevation, the planesman returns the manual member or stick to its null position. This elevation is indicated in the improved system by the part of the movable two-part element of the display panel that is readable on the scale of the elevation or depth indicator. The pull-out elevation indicated on the panel at the elevation indicator corresponds to the ordered elevation or depth of the submarine, as over the normal speed ranges and depending on hull configuration, the depth or elevation error required to pull-out of the maneuver at the ordered elevation or depth is substantially proportional to the pitch tilt angle. The single order and single return movements of the stick by the planesman effects operation of the system so that the craft maneuvers accurately and smoothly to the elevation or depth ordered without overshooting.

One of the features of the invention is provided by the included display panel with pitch angle and elevation or depth indicators and with a movable element having a part readable on the elevation or depth indicator and a part readable with relation to the pitch angle indicator.

Other objects, features and structural details of the invention will be apparent from the following description with relation to the accompanying drawings wherein:

FIG. 1 is a schematic diagram showing the related components of our elevational control system, and FIGS. 2, 3, 4 and 5 are curves used in explaining the operation of the system showing the relation between stick position, plane angle, pitch angle and elevation or depth.

The elevational control system shown in FIG. 1 has particular utility in response to an ordered input to maneuver a craft such as a submarine or aircraft by direction of its diving planes or elevators from one depth or elevation to another depth or elevation. Input orders to the improved system determine the craft's attitude in pitch rather than the angle of movement of the planes or elevators of the craft from a streamline condition. The orders given the control surface of the craft in the improved system bring the craft to its ordered elevation or depth in a level condition with respect to its pitch axis quickly, accurately and smoothly without overshooting.

As shown in FIG. 1, the shaft outputs 10 and 11 of engines 12 and 13 to the planes or elevators of the craft operate to change its attitude about a pitch axis and accordingly cause its depth or elevation to change with respect to a grounded reference. The servo means provided in the improved system to change the depth or elevation of the craft includes the engines 12 and 13 and an elevator or plane order servo indicated at 14. The servo component 14 of the system, shown in FIG. 1, includes a mixer 15 for combining the outputs of the system whose output lead 16 is connected to a motor 17 by way of amplifier 18 and lead 19. The output shaft 20 of the motor 17 drives the rotors of a pair of suitable transmitters or synchros 21, 22 that are energized from a suitable source of electrical power indicated at 23. Leads 24 and 25 operatively connect the respective synchros 21 and 22 to the output controlling engines 12 and 13. As shown, the servo component 14 of the system further includes a repeatback output means for the drive motor 17 in the form of a transmitter or synchro 26 whose rotor is positioned in accordance with the motor output shafting 20. Synchro 26 of the repeatback means provided is energized from the power source 23 and is connected in the described servo means by a lead 27 to the mixer 15.

Elevation change orders for the system are derived from an order transmitter or synchro 28 that is also energized from the power source 23. The means for ordering a pitch angle input $\theta_0$ to the servo 14 includes the synchro 28 and a manually movable member or pitch control stick 29 that is operatively connected to the rotor of the synchro through shafting 30. As shown in FIG. 1, the pitch order output $\theta_0$ of synchro 28 is fed to the servo 14 by way of lead 31, amplifier 32, lead 33, and an "a" sensitivity adjustment 34 and lead 35. The stick or movable member 29 is pivotally mounted on the instrument panel 36 and is biased to a null position by a pair of centering springs 37, 38. The output $\theta_0$ of synchro 28 depends on the movement of the stick or member 29 from its null position by an operator such as the planesman in a submarine or the human pilot in an aircraft. The movement of the stick 29 is observed by the operator on a pitch angle indicator 39 located on a display panel 40 also located on the instrument panel of the craft. Pitch angle indicator 39 includes relatively movable scale and pointer parts and in the arrangement shown, a movable pointer 41 operatively connected to the stick or member 29 through shafting 42 to shafting 30 is moved with respect to a fixed pitch angle scale 43 to provide an order input $\theta_0$ to mixer 15 requiring the craft to dive at a pitch angle of ten degrees. In commanding the elevation change for the illustrative maneuver in a submarine as hereindescribed, the movement of the stick or member 29 under control of the planesman is read on the pitch angle indicator 39 on the display panel 40.

A further component of the system included on the display panel 40 is an elevation or depth indicator 44 having relatively movable scale and pointer parts. As the selected example concerns a submarine, the movable part of the indicator 44 is a depth scale 45 and the relatively fixed pointer part is an index 46 that with relation to the scale 45 shows the indicated present depth of the submarine to be 150 feet. Movement of the scale part 45 of the indicator 44 necessarily depends on a change in the actual depth of the submarine. As represented in FIG. 1, the movable element of indicator 44 of the system is controlled by a suitable elevation or depth detector 46' whose output is fed to a receiver 47 by way of lead 48. The output of receiver 47 is indicated as shafting 49 that is operatively connected to the movable part of the indicator 44. In executing the ordered dive maneuver, the system operates through the provided servo means including servo 14 to cause the submarine to assume a bow lowered pitch attitude and move to a lower depth. This change is observed by the planesman on the depth indicator 44 of display panel 40 by the relative downward movement of the scale part 45 with respect to the fixed index 46 as the submarine descends.

The display panel component 40 of the improved system also includes an order indicator such as the ordered depth indicator 50 shown in FIG. 1. In the form shown, this indicator is provided by a three digit counter with representative numerical indicia corresponding to the indicia included in the scale 45 of the indicator 44. A manually settable crank 51 connected to the counter by suitable shafting is operated by the planesman to indicate the depth ordered for the submarine at the completion of the diving maneuver. The depth to which the planesman has been ordered to maneuver the submarine is set in at the crank 51 before the pitch control stick 29 is moved. As shown in FIG. 1, the depth ordered for the submarine to dive to as represented on the ordered depth indicator 50 in the display panel 40 is 200 feet.

Figure 2:
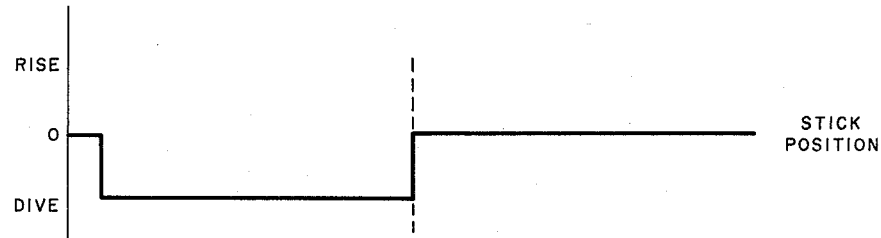

In the operation of the improved system, the output $\theta_0$ of the pitch angle input ordering means from synchro 28 is opposed at the amplifier 32 by the output of means whose output is in accordance with the tilt of the submarine about its pitch axis from a level attitude. As shown in FIG. 1, this means is provided by a suitable vertical reference 52 in the form of a gyro vertical 53 whose rotor case 54 is connected by shafting 55 to the rotor of pitch tilt transmitter or synchro 56. The synchro 56 of the provided output means is energized from power source 23 and is connected to the amplifier 32 by way of a lead 57 to a synchro 58 with a settable knob 59 providing a neutral angle trim adjustment and lead 60. Knob 59 adjusts the output of the connected synchros 56 and 58 to assure that there is no input to amplifier 32 when the submarine is not tilted about its pitch axis with regard to the vertical reference 52. Initial movement of the control stick or member 29 in the direction of the dive arrow in FIG. 1 with corresponding movement of the pointer 41 of indicator 39 results in an ordered output $\theta_0$ from the synchro 28 to mixer 15 to operate the provided servo means to start the dive maneuver herein described. In this regard, with respect to time, FIG. 2 shows the initial movement and return movement of the stick 29 in relation to zero pitch on the pitch scale 43 of the pitch angle indicator 39 required of the planesman to complete the ordered dive maneuver to the ordered depth of 200 feet. The pitch angle at which the maneuver is executed is controlled by the planesman and is limited in the described maneuver to an angle of 10 degrees as shown on the display panel 40 at the pitch angle indicator 39. As the submarine starts the maneuver through operation of its diving planes it pitches downwardly as shown in the curve in FIG. 4, and the pitch tilt output means provides an output $\theta$ to the amplifier 32 that opposes the ordered output $\theta_0$.

Figure 3:
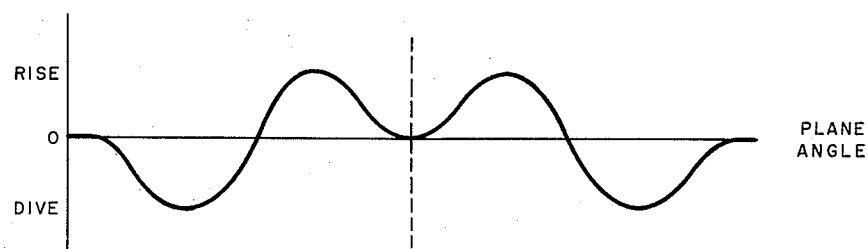
Figure 4:
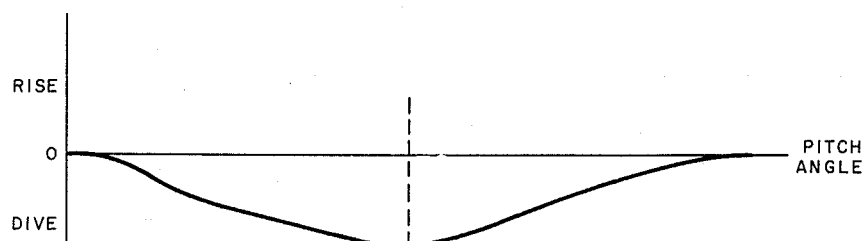

The system further includes a means providing an output $\theta$ to the servo means in accordance with the rate of change of the pitch tilt angle of the submarine. As the submarine starts its dive and accordingly moves about its pitch axis at an increasing rate, the rate output $\theta$ initially opposes the ordered output $\theta_0$ to control the angle of the diving planes together with the output of the repeatback synchro 26. As the pitch tilt increases, the pitch tilt output means provides an output $\theta$ opposing the ordered output $\theta_0$ which decreases to null when the diving pitch tilt angle of the submarine reaches the 10 degree tilt ordered by the planesman on the pitch angle indicator 39 through the pitch control stick 29. As $\theta_0$ diminishes, the output $\theta$ of the rate output means through the included servo means raises the diving planes above a streamline or null condition, as shown in FIG. 3 to slow the submarine's rate of turn about its pitch axis. When the submarine reaches the selected dive pitch angle, the diving planes are in a streamline condition with no input to the included servo means of the system from either the rate output means or the repeatback synchro 26. At this point in the maneuver, the ordered output $\theta_0$ and the output $\theta$ of the pitch tilt angle means are equal and opposite so that there is no input to mixer 15 from the amplifier 32.

As shown in FIG. 1, the rate output means component of the improved system is provided by a pitch angle rate servo or computer 61 with a follow-up motor 62 driven by the output of a data transmission system including a pitch tilt angle synchro 63 and a repeater synchro 64. The rotor of the synchro 63 is connected by shafting 65 to the shafting 55 connected to the rotor of the synchro 56 of the pitch tilt angle output means. The motor 62 of the transmission system receives the output of the repeater synchro 64 by way of lead 66, amplifier 67, and lead 68 and drives the rotor of the noted synchro to null through the connecting shafting 69. Motor 62 is accordingly operated at a rate that is dependent on the actual rate that the submarine is moving about its pitch axis. As shown, the motor 62 also drives a generator 70 by way of shafting 71, the generator including an exciting winding energized from source 23 and an output winding connected to the mixer 15 by way of lead 72, a "b" sensitivity adjustment 73 and lead 74.

To enable the planesman to compare the ordered pitch $\theta_0$ from synchro 28 with the actual tilt of the submarine about its pitch axis from the synchro 58 of the pitch tilt output means as output $\theta$, the display panel 40 further includes an element 75 with a pointer part 75 readable on the scale 43 and with relation to the pointer 41 of the pitch angle indicator 39. As shown, element 75 is a horizontal arm that is driven by the actuating piece 77 of a pitch angle receiver 78 to move across the face of the panel 40 in the directions indicated by the vertical arrows 79, 80. With no input to the receiver 78, the actuating piece 77 is biased so that the element 75 and pointer part 76 assume respective horizontal positions at the center of the panel where the pointer part 76 is at the zero scale reading of the pitch angle indicator 39. As the system operates in response to the dive order input, a pitch angle input is fed the receiver 78 by way of lead 60 and connecting lead 81 from the synchro 58 to move element 75 in the direction of the arrow 79 away from the zero indicia on the pitch scale 43. When the pointer 76 reaches the 10 degree reading on the pitch scale 43 of indicator 39 required by the planesman, the submarine is descending as indicated in the curve in FIG. 4 at a determined pitch attitude with the planes of the submarine in a streamline condition.

Figure 5:
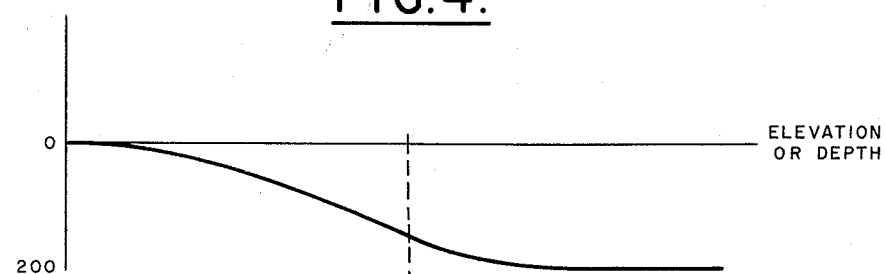

The movable element 75 of the display panel 40 also includes a second pointer part 82 that is read by the helmsman to indicate the ordered or pull-out depth on the scale 45 of the depth indicator 44. The null position of the pointer part 82 corresponds to the index 46 of the depth indicator. As the submarine descends as shown in FIG. 5, the planesman observes the descent on the depth indicator 44. In the described descent, when the pointer part 82 reads 200 feet on the scale 45 of the indicator, the pull-out depth of the maneuver is reached and the pitch control stick 29 is returned to its null position as indicated in FIG. 2. This depth on the indicator 44 corresponds to the setting shown by the ordered depth indicator 50 on the display panel 40. The actual depth of the craft at which the stick 29 is moved for the second time is shown on the indicator 44 to be 150 feet which is the reading of the index pointer 46 on the scale 45. The difference or error between the actual and ordered or pull-out depths indicated in the system is substantially porportional to the angle of pitch at which the dive is executed. The proportionality over the normal speed range depends on the hull configuration of the submarine. The return of the pitch stick 29 to its central position moves pointer 41 to the zero index on the pitch scale 43 and nulls the input to amplifier 32 from the synchro 28. The system then operates from the output $\theta$ of pitch synchro 58 to the mixer 15, the rate output $\theta$ from generator 70 and the repeatback output from synchro 26 as shown in FIG. 3 to first raise the diving planes of the submarine to arrest its descent by movement about its pitch axis in reverse to the dive command input at the initial portion of the maneuvers. This motion is automatically counteracted by the output $\theta$ as the pitch angle approaches zero by the movement of the planes to a diving position so that the submarine arrives at the ordered depth without overshooting with no tilt about its pitch axis and with the planes in streamlined condition. The portion of the curves of FIGS. 3, 4 and 5 to the left of the common vertical dash line shows the operation of the system with relation to plane angle, pitch angle and depth of the submarine with the order input $\theta_0$ therein. The portion of the curves of the same figures to the right of the dash line shows the operation of the system without the order input $\theta_0$ therein.

The response of the improved system is adjusted for varying forward speeds of the craft on which it is used by means including an operative connection between a suitable craft speed computer 83 and the included servo means. As shown in FIG. 1, the speed input to servo 14 from the computer 83 includes the output shafting 84 of the computer 83 connected to the rotor of a synchro 85 energized from source 23. The output lead 86 of the speed synchro is operatively connected to the respective "a" and "b" sensitivity adjustments 34 and 73 to vary the outputs thereof in accordance with the speed of the craft. The output of the "a" adjustment 34 is dependent on the order output $\theta_0$ from synchro 28 and the tilt output $\theta$ from the synchro as combined in the amplifier 32. The "b" adjustment 73 of the system performs similarly for the output $\theta$ from the rate servo 61.

The setting of the knob 106 of the adjustment 73, the components of the adjustment 34, the scale divisions of the pitch angle indicator and scale divisions of the depth or elevation indicator are determined in the sytsem depending on the characteristics of the craft to be controlled as well as its operating speed range. In the improved system depth or elevation changes can be executed at a determined craft pitch angle under control of the helmsman with two movements of the control stick 29. Initial movement of the stick 29 locates pointer 41 with relation to the zero of the scale 43 of indicator 39 to control the angle of pitch $\theta$ of the craft during the maneuver. Return movement of the stick 29, zeros the $\theta_0$ input from synchro 28 and brings the submarine to its ordered depth in a zero pitch attitude condition, smoothly and without overshooting and with the diving planes in a streamlined condition as indicated in the curves shown in FIGS. 5, 4 and 3, respectively.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A pitch angle control system for navigable craft including servo means operable to change the elevation of the craft having a synchro with a repeatback output; a display panel having a pitch angle indicator with relatively movable scale and pointer parts, an elevation indicator with relatively movable scale and pointer parts, and a movable element with a part readable on the pitch angle indicator and a part readable on the elevation indicator; means for ordering a pitch angle input to said servo means including a manually movable member connected to the movable part of the pitch angle indicator, and a synchro connected to the member providing an output depending on the movement of the member from a null position; means including a vertical reference providing an output to the servo means in accordance with the pitch tilt angle of the craft, means providing an output to the servo means in accordance with the rate of change of the pitch tilt angle of the craft, and means responsive to the output of said pitch tilt output means operatively connected to the movable element of the display panel to move the part thereof readable on the pitch indicator to compare actual and ordered craft pitch and move the part thereof readable on the elevation indicator to indicate the pull-out elevation on the elevation indicator.

2. A pitch angle control system as claimed in claim 1, including means for combining the outputs of the pitch angle order synchro and pitch tilt angle output means, and means for adjusting the output of the combining means in accordance with the speed of the craft.

3. A pitch angle control system as claimed in claim 1, including means for adjusting the output of the rate of change output providing means in accordance with the speed of the craft.

4. A pitch angle control system as claimed in claim 1, including means for combining the outputs of the pitch angle order synchro and pitch tilt angle output means, means for adjusting the output of the combining means in accordance with the speed of the craft, and means for adjusting the output of the rate of change output providing means in accordance with the speed of the craft.

5. A system for controlling the depth of a submarine with diving planes including servo means operatively connected to the diving planes having a synchro providing a repeatback output; a display panel having a pitch angle indicator with relatively movable scale and pointer parts, a depth indicator with relatively movable scale and pointer parts and a movable element with a part readable on the scale of the pitch angle indicator and a part readable on the scale of the depth indicator; means for ordering the submarine to change depth including a pitch control stick connected to the movable part of the pitch angle indicator, and a synchro connected to the stick providing an output depending on the movement of the stick from a null position; means including a vertical reference providing an output to the servo means in accordance with the pitch tilt angle of the submarine, means providing an output to the servo means in accordance with the rate of change of pitch tilt angle of the submarine, and means for moving said two part panel element depending on the output of said pitch tilt output means to compare the actual and ordered craft pitch on the pitch indicator to indicate the pull-out depth on the depth indicator.

6. A depth control system as claimed in claim 5, including means for combining the outputs of the depth order change synchro and the pitch tilt angle output means, means for adjusting the output of the combining means in accordance with the speed of the submarine, and means for adjusting the output of the rate of change output providing means in accordance with the speed of the submarine.

7. In pitch angle control systems for navigable craft having servo means operable to change the elevation of the craft; a display panel having a pitch angle indicator with relatively movable scale and pointer parts, an elevation indicator with relatively movable scale and pointer parts, and a movable element with a part readable on the pitch angle indicator and a part readable on the elevation indicator; means for ordering a pitch angle input to said servo means including a manually movable member connected to the movable part of the pitch angle indicator, and a synchro connected to the member providing an output depending on the movement of the member from a null position; means providing an input to the servo means depending on the pitch tilt angle of the craft, means providing an input to the servo means depending on the rate of change of the pitch tilt angle of the craft, and means operatively connecting the two part movable element of the display panel to the craft pitch tilt angle input means.

8. A pitch angle control system as claimed in claim 7, including means for combining the outputs of said pitch order synchro and pitch tilt angle means, and means for adjusting the output of said combining means in accordance with the speed of the craft.

9. A pitch angle control system as claimed in claim 7, including means for adjusting the output of said pitch rate providing output means in accordance with the speed of the craft.

10. In a system for controlling the depth of a submarine with diving planes having servo means operatively connected to the diving planes; a display panel having a pitch angle indicator with fixed scale and movable pointer parts, a depth indicator with movable scale and fixed pointer parts, and a movable element with a part readable on the scale of the pitch angle indicator and a part readable on the scale of the depth indicator; means for ordering the submarine to change depth including a pitch control stick connected to the movable part of the pitch angle indicator, and a synchro connected to the stick providing an output depending on the movement of the stick from a null position; means providing an output depending on the pitch tilt angle of the craft operatively connected to the two part movable element of the display panel and operatively connected to the servo means, and means providing an output depending on the rate of change of the pitch tilt angle operatively connected to the servo means.

11. A submarine depth control system as claimed in claim 10, including means for combining the outputs of said pitch order synchro and pitch tilt angle output means, and means for adjusting the output of said combining means in accordance with the speed of the submarine.

12. A submarine depth control system as claimed in claim 10, including means for adjusting the output of said pitch rate output providing means in accordance with the speed of the craft.

13. In a pitch angle control system for navigable craft; a display panel having a pitch angle indicator with relatively movable scale and pointer parts, an elevation indicator with relatively movable scale and pointer parts, and a movable element with a part readable on the scale of the elevation indicator and a part readable with relation to the pitch angle indicator; a manually operable member connected to move the movable part of the pitch angle indicator in accordance with a pitch input order to the system, and means providing an output in accordance with the pitch tilt angle of the craft operatively connected to the movable two part element of the display panel.

14. In a submarine depth control system; a display panel including a pitch angle indicator with relatively movable scale and pointer parts, a depth indicator with relatively movable scale and pointer parts, and a movable element with a part readable on the scale of the depth indicator and a part readable with relation to the pitch angle indicator; a control stick connected to move the movable part of the pitch angle indicator in accordance with a pitch input order to the system, and means providing an output in accordance with the pitch tilt angle of the submarine operatively connected to the movable two part element of the display panel.

15. In a pitch angle control system for navigable craft, servo means operable to change the elevation of the craft, a pitch angle indicator with relatively movable scale and pointer parts; means for ordering a pitch angle input to the system including a manually movable member connected to the movable part of the pitch angle indicator, and a synchro connected to the member providing an output depending on the movement of the member from a null position; means providing an output depending on the pitch tilt angle of the craft, means providing an output depending on the rate of change of the pitch tilt angle of the craft, means for combining the outputs of the pitch angle order synchro and pitch tilt angle output means, means for adjusting the output of the combining means to the servo means in accordance with the speed of the craft, and means for adjusting the output of the rate of change output means to the servo means in accordance with the speed of the craft.

References Cited in the file of this patent

UNITED STATES PATENTS 2,593,509    West  ---------------- Apr. 22, 1952
2,979,289    Abzug  --------------- Apr. 11, 1961